United States Patent
Ott et al.

(10) Patent No.: US 8,153,752 B2
(45) Date of Patent: Apr. 10, 2012

(54) POLYOLS BASED ON MODIFIED AMINO RESINS, PROCESS FOR THEIR PREPARATION AND THEIR USE

(75) Inventors: Gunther Ott, Munster (DE); Ulrike Rockrath, Senden (DE); Bjorn Feldmann, Munster (DE); Ulrike Clausen-Meiring, Senden (DE); Karl-Heinz Joost, Drensteinfurt-Rinkerode (DE)

(73) Assignee: BASF Coatings GmbH, Munster (DE)

( * ) Notice: Subject to any disclaimer, the term of this patent is extended or adjusted under 35 U.S.C. 154(b) by 368 days.

(21) Appl. No.: 12/160,348

(22) PCT Filed: Feb. 9, 2007

(86) PCT No.: PCT/EP2007/001141
§ 371 (c)(1),
(2), (4) Date: Jul. 9, 2008

(87) PCT Pub. No.: WO2007/090679
PCT Pub. Date: Aug. 16, 2007

(65) Prior Publication Data
US 2010/0273975 A1   Oct. 28, 2010

(30) Foreign Application Priority Data
Feb. 10, 2006 (DE) .......... 10 2006 006 130

(51) Int. Cl.
*C08G 12/30* (2006.01)
*C08G 12/32* (2006.01)
*C08G 12/00* (2006.01)

(52) U.S. Cl. ......... 528/258; 528/256; 528/154; 528/259

(58) Field of Classification Search ............ 528/258, 528/256, 154, 259
See application file for complete search history.

(56) References Cited

U.S. PATENT DOCUMENTS

| | | | |
|---|---|---|---|
| 2,976,261 A | | 3/1961 | Wagner et al. |
| 3,966,665 A | * | 6/1976 | Sakata et al. .......... 524/315 |
| 4,528,344 A | | 7/1985 | Chang |
| 4,533,716 A | * | 8/1985 | Okoshi et al. .......... 528/73 |
| 4,710,230 A | * | 12/1987 | Okoshi et al. .......... 106/413 |
| 6,743,466 B2 | | 6/2004 | Flosbach et al. |
| 2005/0182189 A1 | | 8/2005 | Ohrbom et al. |

FOREIGN PATENT DOCUMENTS

| | | |
|---|---|---|
| DE | 2417915 | 10/1974 |
| DE | 19914899 A1 | 10/2000 |
| DE | 19930067 A1 | 1/2001 |
| DE | 19940855 A1 | 3/2001 |
| DE | 19947523 A1 | 4/2001 |
| DE | 19959923 A1 | 6/2001 |
| DE | 10130972 C1 | 1/2002 |
| DE | 10202565 A1 | 8/2003 |
| DE | 10316890 A1 | 11/2004 |
| EP | 0135741 A2 | 4/1985 |
| EP | 0199605 A2 | 10/1986 |
| GB | 1163369 | 9/1969 |
| WO | WO94/11123 A1 | 3/1994 |
| WO | WO2007028792 | 3/2007 |

OTHER PUBLICATIONS

Written Opinion for PCT/EP2007/001141 filed Feb. 9, 2007.
International Search Report for PCT/EP2007/001141 dated Apr. 4, 2007.

* cited by examiner

*Primary Examiner* — Duc Truong
(74) *Attorney, Agent, or Firm* — Cantor Colburn LLP

(57) ABSTRACT

Disclosed herein is a polyol (A) based on modified amino resins, prepared by reacting: an amino resin (B) comprising three acetalized or etherified N-methylol groups of the general formula (I) >N—CHR—OR$^1$, wherein R is a hydrogen atom, an alkyl group of 1 to 6 carbon atoms or an aryl group of 6 to 10 carbon atoms and R$^1$ is an alkyl group of 1 to 6 carbon atoms; with a polyol (C) of the general formula (II) R$^2$(—OH)$_n$, wherein n is a number from 2 to 6 and R$^2$ is a divalent to hexavalent organic radical; wherein an equivalent ratio of the acetalized or etherified N-methylol groups to the polyol (C) is 0.5:1 to 1.2:1; with elimination of at least 50 mol % of a monoalcohol (D) of the general formula R$^1$—OH, wherein R$^1$ is as defined above, from the amino resin (B).

26 Claims, No Drawings

POLYOLS BASED ON MODIFIED AMINO RESINS, PROCESS FOR THEIR PREPARATION AND THEIR USE

CROSS REFERENCE TO RELATED APPLICATIONS

This Application is the National Stage of International Application No. PCT/EP2007/001141, filed Feb. 9, 2007, which claims priority to German Application No. 10 2006 006 130.6, filed Feb. 10, 2006.

FIELD OF THE INVENTION

The present invention relates to new polyols based on modified amino resins. The present invention also relates to a new process for modifying amino resins. The present invention relates not least to the use of the new polyols based on modified amino resins, and of the polyols prepared by means of the new process for modifying amino resins, as curable materials or for preparing them.

BACKGROUND

Amino resins, especially acetalized or etherified melamine/formaldehyde resins, and their use as crosslinking agents in thermally curable materials, especially coating materials, have been known for some time (cf., for example, Johan Bieleman, "Lackadditive", "7.2.2 Melamine resin-crosslinking systems", Wiley-VCH, Weinheim, N.Y., 1998, pages 242 to 250). The coating materials in question are known to give coatings having a high surface hardness.

The stability of these coating materials on storage, however, is limited, owing to the presence therein of acid catalysts.

Moreover, the amino resins have a propensity toward self-condensation, thereby raising the brittleness of the coatings and reducing their elasticity.

The amino resins, particularly the etherified melamine/formaldehyde resins, are also used as co-crosslinking agents in coating materials which are prepared from what are known as multicomponent systems, especially two-component systems. As is known, the multicomponent systems include at least one binder component, which comprises preferably hydroxyl-containing constituents, and at least one crosslinking component, which comprises preferably polyisocyanates. The two components are stored separately from one another and mixed with one another only a short time before being used to prepare the actual coating material. The coatings produced from these coating materials are known to have advantageous combinations of properties, such as good etch resistance and good wet scratch resistance.

However, in the course of the thermal curing of these coating materials, alcohol bound in acetal form can be eliminated from the amino resins, thereby unpredictably altering the original equivalent ratio of hydroxyl groups to isocyanate groups. Then, by reaction with the polyisocyanates, the liberated alcohol automatically forms network endgroups in the resulting thermoset material, which can disadvantageously reduce the network density and hence the scratch resistance of the coatings in question.

The modification of amino resins with compounds containing a carbamate group, such as methyl carbamate, for example, is known from the American patent application US 2005/0182189 A1. In this case the resulting amino resins contain groups of the formula >N—CH$_2$—NH—C(O)—OCH$_3$. However, on account of an absence of isocyanate-reactive functional groups, and of their high melting point and high crosslinking temperatures, these amino resins are unsuited to use as constituents of multicomponent systems.

SUMMARY

The object on which the present invention was based was that of providing new substances which can be used outstandingly as new, thermally curable materials or constituents for new, thermally curable materials, and which are readily preparable from known, easily obtainable starting products.

The new, thermally curable materials ought to be stable on storage, transportable, and, in particular, outstandingly suitable for use as new coating materials, adhesives, sealants, and precursors for moldings and films, especially coating materials, more particularly coating materials which are prepared from multicomponent systems a short time before being used.

The new coating materials ought in particular to have outstanding suitability for use as electrocoat materials, primecoating materials, surfacers, primers, basecoat materials, solid-color topcoat materials, and clearcoat materials, especially clearcoat materials.

The new, thermally curable materials ought also to be outstandingly suitable for producing new thermoset materials, especially coatings, adhesive layers, seals, moldings, and films, particularly coatings.

The new coatings ought in particular to be new electrocoats, prime coatings, surfacer coats, antistonechip primer coats, basecoats, solid-color topcoats, and clearcoats, especially clearcoats, more particularly clearcoats of multicoat color and/or effect paint systems, having an outstanding profile of properties.

In particular the new coatings ought to exhibit high etch resistance, chemical resistance, weathering stability, and moisture resistance, very good leveling, an outstanding overall appearance, very good wet scratch resistance, and particularly high dry scratch resistance.

Found accordingly have been the new polyols (A) based on modified amino resins, preparable by reacting at least one amino resin (B) containing at least three acetalized or etherified N-methylol groups of the general formula I:

$$>\text{N—CHR—OR}^1 \tag{I},$$

in which the variable R is a hydrogen atom, an alkyl group of 1 to 6 carbon atoms or an aryl group of 6 to 10 carbon atoms and the variable $R^1$ is an alkyl group of 1 to 6 carbon atoms, with at least one polyol (C) of the general formula II:

$$R^2(\text{—OH})_n \tag{II},$$

in which the index n is a number from 2 to 6 and the variable $R^2$ is a divalent to hexavalent organic radical, in an equivalent ratio III:

$$\text{group I of (B):polyol (C)=0.5 to 1.2} \tag{III};$$

with elimination of at least 50 mol % of a monoalcohol (D) of the general formula Ia:

$$R^1\text{—OH} \tag{Ia},$$

in which the variable $R^1$ is as defined above, from the amino resin (B).

The new polyols (A) based on modified amino resins are referred to below as "polyols (A) of the invention".

Also found has been the new process for preparing the polyols (A) of the invention, which involves reacting at least one amino resin (B) containing at least three acetalized or etherified N-methylol groups of the general formula I:

$$>\text{N—CHR—OR}^1 \tag{I},$$

in which the variable R is a hydrogen atom, an alkyl group of 1 to 6 carbon atoms or an aryl group of 6 to 10 carbon atoms and the variable $R^1$ is an alkyl group of 1 to 6 carbon atoms, with at least one polyol (C) of the general formula II:

$$R^2(\text{—OH})_n \tag{II}$$

in which the index n is a number from 2 to 6 and the variable $R^2$ is a divalent to hexavalent organic radical, in an equivalent ratio III:

$$\text{group I of (B):polyol (C)}=0.6 \text{ to } 1.2 \tag{III};$$

with elimination of at least 50 mol % of a monoalcohol (D) of the general formula Ia:

$$R^1\text{—OH} \tag{Ia},$$

in which the variable $R^1$ is as defined above, from the amino resin (B).

The new process for preparing the polyols (A) of the invention is referred to below as "process of the invention".

Found not least has been the new use of the polyols (A) of the invention and of the polyols (A) of the invention prepared by the process of the invention as thermally curable materials or for preparing thermally curable materials, this being referred to below as "inventive use".

Additional subject matter of the invention will become apparent from the description.

DETAILED DESCRIPTION

In the light of the prior art it was surprising and unforeseeable for the skilled worker that the object on which the present invention was based could be achieved by means of the polyols (A) of the invention, the process of the invention, and the inventive use.

In particular it was surprising that the polyols (A) of the invention could be used outstandingly, in the context of the inventive use, as new, thermally curable materials or constituents for new, thermally curable materials, and were particularly readily producible by means of the process of the invention from known, easily obtainable starting products.

The thermally curable materials of the invention were stable on storage, transportable, and in particular outstandingly suitable for use as new coating materials, adhesives, sealants, and precursors for moldings and films, especially coating materials, more particularly coating materials which were prepared from multicomponent systems a short time before being used.

The coating materials of the invention were outstandingly suitable in particular for use as new electrocoat materials, prime-coating materials, surfacers, primers, basecoat materials, solid-color topcoat materials, and clearcoat materials, especially clearcoat materials.

The thermally curable materials of the invention were outstandingly suitable, moreover, for producing new thermoset materials, especially coatings, adhesive layers, seals, moldings, and films, particularly coatings.

The coatings of the invention were, in particular, new electrocoats, prime coatings, surfacer coats, antistonechip primer coats, basecoats, solid-color topcoats, and clearcoats, especially clearcoats, more particularly clearcoats of multicoat color and/or effect paint systems, having an outstanding profile of properties.

In particular the coatings of the invention exhibited high etch resistance, chemical resistance, weathering stability, and moisture resistance, very good leveling, an outstanding overall appearance, very good wet scratch resistance, and particularly high dry scratch resistance.

The coatings of the invention, especially the clearcoats of the invention, were therefore outstandingly suitable for the coating of particularly high-value economic goods, especially automobile bodies and parts thereof.

The preparation of the polyols (A) of the invention as part of the process of the invention starts from at least one, especially one, amino resin (B) which contains at least three, preferably at least four, more preferably five, and in particular six acetalized or etherified N-methylol groups of the general formula I:

$$>\text{N—CHR—OR}^1 \tag{I},$$

in which the variable R is a hydrogen atom, an alkyl group of 1 to 6 carbon atoms or an aryl group of 6 to 10 carbon atoms, but particularly a hydrogen atom, and the variable $R^1$ is an alkyl group of 1 to 6, preferably 1 to 4, carbon atoms, but particularly methyl, butyl or isobutyl.

Preferably the amino resin (B) is selected from the group consisting of melamine resins, guanamine resins, urea resins, and glycoluril resins and also amides and compounds containing at least two carbamate groups. In particular the amino resin (B) is a melamine resin.

The amino resins (B) are time-honored compounds and are described for example in detail in the American patent application US 2005/0182189 A1, page 1, paragraphs [0014], to page 4, paragraph [0028].

In accordance with the invention the amino resin (B) is reacted with at least one polyol (C) and preferably at least two and in particular two polyols (C) of the general formula II:

$$R^2(\text{—OH})_n \tag{II},$$

in which the index n is a number from 2 to 6, preferably an integer from 2 to 6, more preferably 2 or 3, and in particular 2, and the variable $R^2$ is a divalent to hexavalent, preferably divalent or trivalent and especially divalent, organic radical.

The organic radicals $R^2$ are preferably radicals which include or are composed of aliphatic, cycloaliphatic and/or aromatic groups. Preferably they contain 2 to 50, more preferably 2 to 40, very preferably 2 to 30 carbon atoms. In addition they may also contain functional groups which link the aliphatic, cycloaliphatic and/or aromatic groups to one another, as described for example in German patent application DE 199 47 523 A1, page 5, lines 38 to 47.

Moreover, they may be substituted. Examples of suitable substituents are known from German patent application DE 199 59 923 A1, page 7, line 65, to page 8, line 5. What is important is that the substituents and the linking functional groups do not adversely affect the reaction between the amino resin (B) and the polyol (C)—for example, by inhibiting said reaction or leading to unwanted byproducts.

Examples of suitable polyols (C) are triols, tetraols, pentitols, and hexitols, such as trimethylolmethane, trimethylolethane, trimethylolpropane, glycerol, erythritol, threitol, pentaerythritol, dipentaerythritol, homopentaerythritol, arabitol, adonitol, xylitol, mannitol, sorbitol, dulcitol, and inositol.

Examples of suitable diols (C) are cyclic and acyclic $C_9$-$C_{16}$-alkanes functionalized with two hydroxyl groups.

Suitable $C_9$-$C_{16}$-alkanes from which the diols (C) derive include basically all linear and branched, preferably branched, alkanes having 9 to 16 carbon atoms.

The $C_9$-$C_{16}$-alkanes from which the compounds (C) derive are preferably selected from the group consisting of 2-methyloctane, 4-methyloctane, 2,3-dimethylheptane, 3,4-dimethylheptane, 2,6-dimethylheptane, 3,5-dimethylheptane, 2-methyl-4-ethylhexane, isopropylcyclohexane, 4-ethyloctane, 2,3,4,5-tetramethylhexane, 2,3-diethylhexane, 1-methyl-2-n-propylcyclohexane, 2,4,5,6-tetramethylheptane, 3-methyl- 6-ethyloctane, 1'-ethylbutyl-cyclohexane, positionally isomeric diethyloctanes, 3,4-dimethyl-5-ethylnonane, 4,6-dimethyl-5-ethylnonane, 3,4-dimethyl-7-ethyldecane, 3,6-diethylundecane, 3,6-dimethyl-9-ethylundecane, 3,7-diethyldodecane, and 4-ethyl-6-isopropylundecane.

More preferably the $C_9$-$C_{16}$-alkanes are positionally isomeric diethyloctanes.

Preferred compounds (C) are, accordingly, the positionally isomeric diethyloctanediols, more preferably those containing linear $C_8$ carbon chains.

In respect of the two ethyl groups, said $C_8$ carbon chain may have the substitution pattern 2,3, 2,4, 2,5, 2,6, 2,7, 3,4, 3,5, 3,6 or 4,5.

Similarly, with respect to the two hydroxyl groups, the $C_8$ carbon chain may have the substitution pattern 1,2, 1,3, 1,4, 1,5, 1,6, 1,7, 1,8, 2,3, 2,4, 2,5, 2,6, 2,7, 2,8, 3,4, 3,5, 3,6, 3,7, 3,8, 4,5, 4,6, 4,8, 5,6, 5,7, 5,8, 6,7, 6,8 or 7,8.

The diethyloctanediols (C) are preferably selected from the group consisting of:
2,3-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol,
2,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol,
2,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol,
2,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol,
2,7-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol,
3,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol,
3,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol,
3,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol, and
4,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8-, and -7,8-diol.

More preferably the two ethyl groups are in 2,4 position.

More preferably the two hydroxyl groups are in 1,5 position.

In particular the diol (C) used is 2,4-diethyloctane-1,5-diol.

The positionally isomeric diethyloctanediols (C) are compounds which are known per se and can be prepared by customary and known synthesis methods of organic chemistry, such as that of base-catalyzed aldol condensation, or are obtained as byproducts of industrial chemical syntheses such as the preparation of 2-ethylhexanol.

Further examples of suitable diols (C) are known from German patent application DE 199 48 004 A1, page 5, line 38, to page 6, line 7. Use is made in particular of propylene glycol and of neopentyl glycol hydroxypivalate.

In accordance with the invention the amino resin (B) and the polyol (C) are reacted with one another in a proportion such that there is an equivalent ratio III of group I of (B):polyol (C)=0.5 to 1.2, preferably 0.6 to 1.1, and in particular 1.

In accordance with the invention, in this reaction, at least 50 mol %, preferably at least 60 mol %, and in particular at least 70 mol % of at least one monoalcohol (D) of the general formula Ia:

in which the variable $R^1$ is as defined above, is eliminated from the amino resin (B). The monoalcohol (D) is preferably methanol, n-butanol or isobutanol, especially methanol.

Preferably the reaction is carried out at 80 to 150° C. During this reaction, preferably, the monoalcohol (D) is removed continuously from the reaction mixture.

The reaction can be carried out in organic solution. Preferably it is carried out in bulk (without solvent).

For the process of the invention, the amino resin (B) and the polyol (C) are preferably reacted in the presence of a catalyst (E). More preferably an acid catalyst (E) is used. Use is made in particular of an acid catalyst (E) of the kind commonly used for condensing melamine resins. Examples of suitable catalysts (E) are known from Johan Bieleman, "Lackadditive", "7.2.2 Melamine resin-crosslinking systems", Wiley-VCH, Weinheim, N.Y., 1998, pages 242 to 250.

The resulting polyols (A) of the invention may be put to any of a very wide variety of end uses. In the context of the inventive use they serve preferably as thermally curable materials of the invention or for preparing the thermally curable materials of the invention.

The thermally curable materials of the invention may additionally be curable physically, oxidatively and/or with actinic radiation. By actinic radiation is meant electromagnetic radiation, such as near infrared (NIR), visible light, UV radiation, X-rays, and gamma radiation, especially UV radiation, and particulate radiation, such as electron beams, beta radiation, proton beams, neutron beams, and alpha radiation, especially electron beams.

The materials of the invention are preferably used as new coating materials, adhesives, sealants, and precursors for moldings and films, curable thermally or both thermally and with actinic radiation.

More preferably they are used as coating materials of the invention.

The coating materials of the invention may be conventional coating materials based on organic solvents, aqueous coating materials, pulverulent coating materials, or suspensions of powders (powder slurries). They may be one-component or multicomponent systems, especially two-component systems. More preferably they are two-component systems which are composed of a binder component, which comprises constituents containing isocyanate-reactive functional groups, especially hydroxyl groups, and a crosslinking component, which comprises polyisocyanates.

With particular preference the coating materials of the invention are new electrocoat materials, prime-coating materials, surfacers, primers, basecoat materials, solid-color top-coat materials, and clearcoat materials, especially clearcoat materials.

Viewed in terms of method, the preparation of the thermally curable materials of the invention offers no peculiarities; instead, they are prepared by mixing the polyols (A) of the invention with customary and known constituents of coating materials, and subsequently homogenizing the mixtures. Examples of suitable mixing assemblies for preparing the thermally curable materials of the invention are stirred tanks, inline dissolvers, rotor/stator dispersers, Ultraturrax devices, microfluidizers, high-pressure homogenizers or nozzle jet dispersers. Where the thermally curable materials of the invention are to include constituents which can be activated with actinic radiation, it is advisable to exclude actinic radiation when preparing, and subsequently storing, the thermally curable materials of the invention.

The amount of the polyols (A) of the invention in the thermally curable materials of the invention may vary very widely and so be tailored optimally to the requirements of the case in hand. Preferably the amount of (A) is 5% to 95%, more preferably 5% to 90%, very preferably 10% to 80%, and in particular 10% to 70% by weight, based in each case on the solids of the coating material of the invention, the "solids" being the sum of all constituents which constitute the thermoplastic material of the invention produced from the thermally curable material of the invention.

The customary and known constituents of the coating materials are preferably selected from the group consisting of binders curable oxidatively, physically, thermally and/or with actinic radiation; crosslinking agents; neutralizing agents; organic solvents; reactive diluents curable thermally, with actinic radiation, and both thermally and with actinic radiation; transparent and opaque color pigments, effect pigments, and color and effect pigments; transparent and opaque fillers; nanoparticles; molecularly dispersely soluble dyes; light stabilizers; antioxidants; wetting agents; emulsifiers; slip additives; polymerization inhibitors; thermal crosslinking catalysts; thermolabile free-radical initiators; photoinitiators and photocoinitiators; adhesion promoters; flow control agents; film formation assistants; rheological assistants, flame retardants; corrosion inhibitors; waxes; siccatives; biocides; and matting agents.

They are preferably used in the customary and known, effective amounts.

Where the thermally curable materials of the invention are clearcoat materials or precursors for clear films and moldings, they do not contain opaque constituents.

Examples of suitable constituents of coating materials are known from German patent application DE 199 14 899 A1, page 14, line 36, to page 16, line 63, page 17, line 7, to page 18, line 13, page 18, lines 16 to 21, and page 19, lines 10 to 22 and 30 to 61.

In the context of the inventive use, the thermally curable materials of the invention serve for producing the thermoset materials of the invention.

The thermoset materials of the invention are preferably new coatings, adhesive layers, seals, moldings, and films, especially new coatings.

The coatings of the invention more preferably are new electrocoats, prime coatings, surfacer coats or antistonechip primer coats, basecoats, solid-color topcoats, and clearcoats, especially clearcoats.

These coating systems of the invention may be single-coat or multicoat systems. With very particular preference they are multicoat systems and in that case may comprise at least two coats, in particular at least one electrocoat, at least one surfacer coat or antistonechip primer coat, and at least one basecoat and at least one clearcoat, or at least one solid-color topcoat.

With particular preference the multicoat paint systems of the invention comprise at least one basecoat and at least one clearcoat.

It is of particular advantage to produce the clearcoats of the multicoat paint systems of the invention from the clearcoat materials of the invention.

The clearcoats of the invention comprise the outermost coat of the multicoat paint systems of the invention, substantially determining the overall appearance and protecting the color and/or effect basecoats from mechanical, chemical, and radiation-induced damage. In this context the clearcoats of the invention prove to be
  particularly insensitive to mechanical stress, such as tension, strain, impacts, scratching or abrasion,
  particularly resistant to moisture (in the form of water vapor, for example), solvents, and dilute chemicals, and
  particularly resistant toward environmental influences such as temperature fluctuations and UV radiation, and
  to have
  a high gloss and
  effective adhesion to any of a very wide variety of substrates.

Not least, they do not exhibit any yellowing following their production.

Depending on intended use, the materials of the invention are applied to temporary or permanent substrates.

For producing films and moldings of the invention it is preferred to use customary and known temporary substrates, such as metallic and polymeric belts or hollow bodies made of metal, glass, plastic, wood or ceramic, which are easily removable without damaging the films and moldings of the invention.

Where the mixtures of the invention are used for producing coatings, adhesive layers, and seals, the substrates employed are permanent.
  More preferably the substrates are
  means of land, water or air transport operated by muscle power, hot air or wind, such as cycles, railroad trolleys, rowboats, sailboats, hot air balloons, gas balloons, or sail planes, and parts thereof,
  motorized means of land, water or air transport, such as motorcycles, utility vehicles or motor vehicles, especially automobiles, water going or underwater craft or aircraft, and parts thereof,
  stationary floating structures, such as buoys or parts of harbor installations,
  the interior and exterior of buildings,
  doors, windows, and furniture, and
  hollow glassware,
  small industrial parts, such as nuts, bolts, hubcaps or wheel rims,
  containers, such as coils, freight containers or packaging,
  electrical components, such as electronic windings, coils for example,
  optical components,
  mechanical components, and
  white goods, such as household appliances, boilers and radiators.

The films and moldings of the invention may likewise serve as substrates.

In particular the substrates are automobile bodies and parts thereof. The thermally curable materials of the invention and the coatings of the invention produced from them serve in this case preferably for the OEM finishing of automobile bodes or for the refinishing of inventive and noninventive OEM finishes. The OEM finishes of the invention, particularly those which include a clearcoat of the invention, have outstanding overcoatability. The refinishes of the invention adhere outstandingly to the inventive and noninventive OEM finishes.

In terms of method the application of the thermally curable materials of the invention has no peculiarities but may instead take place by all customary and known application methods that are suitable for the mixture in question, such as electrodeposition coating, injecting, spraying, knifecoating, spreading, pouring, dipping, trickling or rolling, for example. Preference is given to employing spray application methods.

In the course of application it is advisable to operate in the absence of actinic radiation if the thermally curable materials of the invention are additionally curable with actinic radiation.

For the production of the multicoat paint systems of the invention it is possible to employ wet-on-wet methods and coating systems of the kind known, for example, from German patent application DE 199 30 067 A 1, page 15, line 23, to page 16, line 36, or DE 199 40 855 A1, column 30, line 39, to column 31, line 48, and column 32, lines 15 to 29. It is a very important advantage of the inventive use that basically all the coats of the multicoat paint systems of the invention can be produced from the thermally curable materials of the invention.

The thermal curing of the thermally curable materials of the invention takes place or even begins preferably at room temperature.

Alternatively it may take place only after a certain rest time or flash-off time. The flash-off time or rest time may have a duration of 30 seconds to 2 hours, preferably 1 minute to 1 hour, and especially 1 to 45 minutes. The purpose of the rest time is, for example, to allow the applied materials of the invention to flow out and undergo devolatization, and for the evaporation of volatile constituents such as any solvent that may be present. Flashing off may be accelerated by means of an elevated temperature and/or a reduced atmospheric humidity.

The thermal curing of the applied materials of the invention may be accelerated, for example, by exposure to a gaseous, liquid and/or solid, hot medium, such as hot air, heated oil or heated rolls, or to microwave radiation or infrared and/or near-infrared (NIR) light. Heating takes place preferably in a forced-air oven or by exposure to IR and/or NIR lamps.

Curing with actinic radiation may be carried out by means of the customary and known apparatus and methods, as are described, for example, in German patent application DE 198 18 735 A 1, column 10, lines 31 to 61, German patent application DE 102 02 565 A1, page 9, paragraph [0092], to page 10, paragraph [0106], German patent application DE 103 16 890 A1, page 17, paragraphs [0128] to [0130], international patent application WO 94/11123, page 2, line 35, to page 3, line 6, page 3, lines 10 to 15, and page 8, lines 1 to 14, or the U.S. Pat. No. 6,743,466 B2, column 6, line 53, to column 7, line 14.

The curing of the thermally curable materials of the invention may also be carried out with substantial or complete exclusion of oxygen.

For the purposes of the present invention the oxygen is considered to be substantially excluded when its concentration at the surface of the applied mixtures of the invention is <21%, preferably <18%, more preferably <16%, very preferably <14%, with very particular preference <10%, and in particular <6% by volume.

For the purposes of the present invention the oxygen is considered to be completely excluded when its concentration at the surface is below the limit of the customary and known detection methods.

The oxygen concentration is preferably ≧0.001%, more preferably ≧0.01%, very preferably ≧0.1%, and in particular ≧0.5% by volume.

The desired oxygen concentrations can be imposed by means of the measures described in German patent DE 101 30 972 C1, page 6, paragraphs [0047] to [0052], or by the laying-on of films.

The resulting thermoset materials of the invention, preferably the films, moldings, coatings, adhesive layers, and seals of the invention, more preferably the coatings of the invention, with very particular preference the electrocoats, prime coatings, surfacer coats or antistonechip primer coats, basecoats, solid-color topcoats, and clearcoats of the invention, especially the clearcoats of the invention, are outstandingly suitable for coating, bonding, sealing, wrapping, and packaging the above-described primed or unprimed substrates, and also for mounting on or installation in the primed or unprimed substrates described above.

The resulting substrates of the invention coated with coatings of the invention, bonded with adhesive layers of the invention, sealed with seals of the invention and/or wrapped, packaged and/or joined with films and/or moldings of the invention have outstanding service properties in conjunction with a particularly long service life.

EXAMPLES

Inventive Example 1

The Preparation of Polyol (A1)

A reactor equipped with stirrer, reflux condenser, internal thermometer, and inert gas inlet tube was charged under a nitrogen atmosphere with 210 parts by weight of the commercial melamine/formaldehyde resin Cymel® 303 from Cytec (hexamethoxymethylmelamine, HMMM, theoretical number-average molecular weight 390 daltons). Then 652.6 parts by weight of 2,4-diethyloctane-1,5-diol (DEOD, theoretical number-average molecular weight 202 daltons) were added, after which the resulting mixture was heated at 80° C. with stirring. Following the addition of 1.7 parts by weight of p-toluenesulfonic acid (0.2% by weight, based on the reactants) the reaction mixture was heated in steps to 130° C. During this time the volatile constituents were distilled off continuously, and about 70% of the theoretical amount of methanol were collected in the receiver. When distillate had no longer gone over, the reaction was terminated. The reaction mixture was cooled to 50° C. and discharged without addition of organic solvents. This gave a polyol (A1) which was liquid at room temperature and had a theoretical solids content of 100% by weight and calculated hydroxy equivalent weight of 235.

Polyol (A1) was outstandingly suitable for preparing coating materials, adhesives and sealants and for preparing precursors for moldings and films. It was outstandingly suitable in particular for preparing multicomponent systems which included polyisocyanate-containing crosslinking components.

Inventive Examples 2 to 5

The Preparation of Polyols (A2) to (A5)

Using the procedural instructions indicated in Example 1, polyols (A2) to (A5) were prepared from the starting products given in Table 1. The HMMM used was the same as that in Example 1. The listed parts are parts by weight. Key properties of the resulting polyols (A2) to (A5) are likewise found in Table 1.

TABLE 1

Preparation and properties of polyols (A2) to (A5)

| polyol | starting products: HMMM (parts) | diol (parts) | theoretical solids content (% by weight) | theoretical hydroxy equivalent weight |
|---|---|---|---|---|
| A2 | (210) | HPN[a] (990) | (100) | 169.5 |
| A3 | (390) | PG[b] (456) | (100) | 109 |
| A4 | (390) | DEOD[c] (606) PG[b] (228) | (100) | 172 |
| A5 | (390) | DEOD[c] (808) HPN[a] (408) | (100) | 238 |

[a] neopentyl glycol hydroxypivalate;
[b] propylene glycol;
[c] 2,4-diethyloctane-1,5-diol.

Polyols (A2) to (A5) were also outstandingly suitable for preparing coating materials, adhesives, sealants, and precursors for moldings and films. They were outstandingly suitable in particular for preparing multicomponent systems which included polyisocyanate-containing crosslinking components.

Inventive Examples 6 to 9 and Comparative Example C1

The Preparation of Clearcoat Materials 1 to 4 of Inventive Examples 6 to 9, and Clearcoat Material C1 of Comparative Example C1

Clearcoat materials 1 to 4 and C1, of Inventive Examples 6 to 9 and Comparative Example C1 respectively, were prepared by first preparing a hydroxyl-containing methacrylate copolymer binder, in accordance with the following procedural instructions:

A reactor equipped with stirrer, reflux condenser, internal thermometer, nitrogen inlet tube, and two feed vessels was charged with 721 parts by weight of pentyl acetate and this initial charge was heated to 137° C. At that temperature a mixture of 452.5 parts by weight of hydroxyethyl methacrylate, 306.7 parts by weight of styrene, 521.5 parts by weight of ethylhexyl methacrylate, 230.1 parts by weight of hydroxybutyl acrylate, and 23 parts by weight of acrylic acid was metered into the initial charge from one of the feed vessels at a uniform rate over the course of four hours. From the other feed vessel, beginning simultaneously, an initiator solution composed of 153.4 parts by weight of tert-butyl perethylhexanoate and 92.4 parts by weight of pentyl acetate was metered into the initial charge at a uniform rate over 4.5 hours. After the end of the initiator feed the reaction mixture was polymerized at 137° C. for a further two hours. After it had cooled, the resulting binder solution was diluted with pentyl acetate to a solids content of 65% by weight (determined in a forced-air oven at 130° C. over one hour). The hydroxyl number was 185 mg KOH/g resin solids, corresponding to a hydroxy equivalent weight of 303.

Table 2 gives an overview of the physical composition of clearcoat materials 1 to 4 and C1 of Inventive Examples 6 to 9 and Comparative Example C1 respectively.

TABLE 2

Physical composition of clearcoat materials 1 to 4 of Inventive Examples 6 to 9 and of clearcoat material C1 of Comparative Example C1

| | Example (parts by weight): | | | | |
|---|---|---|---|---|---|
| | C1 | 6 | 7 | 8 | 9 |
| | | clearcoat material: | | | |
| Ingredient | C1 | 1 | 2 | 3 | 4 |
| Binder component: | | | | | |
| Binder solution | 112.3 | 71.28 | 75.31 | 71.24 | 64.66 |
| Butyl glycol acetate | 12 | 12 | 12 | 12 | 12 |
| Butyl acetate | 16.76 | 30.87 | 29.13 | 30.88 | 32.69 |
| Solventnaphtha ® | 6 | 6 | 6 | 6 | 6 |
| Byk ® 306[a] | 0.48 | 0.48 | 0.48 | 0.48 | 0.48 |
| Dibutyltin dilaurate (5 percent) | 0.24 | 0.19 | 0.2 | 0.19 | 0.19 |
| A1 | — | 23.96 | — | — | — |
| A4 | — | — | 18.53 | — | 23.86 |
| A5 | — | — | — | 24.01 | — |
| Crosslinking component: | | | | | |
| Desmodur ® N3390[b] | 52.2 | 55.52 | 58.34 | 55.19 | 60.11 |
| Equivalent ratio: | | | | | |
| Hydroxyl groups from: | | | | | |
| Binder solution | 1 | 0.6 | 0.6 | 0.6 | 0.5 |
| Polyol A | — | 0.4 | 0.4 | 0.4 | 0.5 |
| Isocyanate groups | 1 | 1 | 1 | 1 | 1 |

[a] commercial paint additive from Altana Chemie;
[b] commercial polyisocyanate based on hexamethylene diisocyanate, from BayerMaterialScience; 90 percent in butyl acetate; isocyanate equivalent weight 195.

The binder components of Inventive Examples 6 to 9 in Table 2 were transportable and could be stored for months without any settling, separation of ingredients, or increase in viscosity. The clearcoat materials 1 to 4 and C1, prepared from the two-component systems of Inventive Examples 6 to 9 and then Comparative Example C1, had a pot life or processing time, i.e., the time within which they were capable of being applied without problems, of several hours. For application purposes they were adjusted to a spray viscosity of 25 to 30 seconds in the DIN4 cup by addition of butyl acetate.

Inventive Examples 10 to 13 and Comparative Example C2

The Production of Black Multicoat Paint Systems 1 to 4 and C1 of Inventive Examples 10 to 13 and Comparative Example C2 Respectively Multicoat paint system 1 of Inventive Example 10 was produced using clearcoat material 1 of Inventive Example 6.
Multicoat paint system 2 of Inventive Example 11 was produced using clearcoat material 2 of Inventive Example 7.
Multicoat paint system 3 of Inventive Example 12 was produced using clearcoat material 3 of Inventive Example 8.
Multicoat paint systems 4 of Inventive Example 13 were produced using clearcoat material 4 of Inventive Example 9.
Multicoat paint system C1 of Comparative Example C2 was produced using clearcoat material C1 of Comparative Example C1.

The multicoat paint systems produced were made black since that allowed particularly effective assessment of their leveling, appearance, and scratch resistance. They were produced in accordance with the following general procedural instructions:

Atop phosphated steel panels coated with an electrocoat, a surfacer coat, and a cured black basecoat, the clearcoat materials were applied evenly in two spray passes with a 4-minute flash-off time in between, to give a dry film thickness of 50 μm. The resulting clearcoat films were flashed off at room temperature for 10 minutes and dried in a forced-air oven at 60° C. for 45 minutes.

Leveling and overall appearance were assessed visually.

The gloss (20°) was measured in accordance with DIN 67530.

The wet scratch resistance was determined by means of the wash brush test after 10 cycles. Parameters measured were the residual gloss (%) after exposure and after reflow (2 hours/ 60° C.).

The dry scratch resistance was determined using the Rotahub test and using a Crockmeter (9 μm paper). The parameter measured in each case was the residual gloss (%) after exposure, without reflow.

The results are found in Table 3.

TABLE 3

Leveling, appearance, and scratch resistance of black multicoat paint systems 1 to 4 of Inventive Examples 10 to 13 and of multicoat paint system C1 of Comparative Example C2

| Example/ paint system | leveling | appearance | wash brush test (exposure/reflow) | Rotahub | Crockmeter |
|---|---|---|---|---|---|
| 10/1 | very good | glossy | 75/87 | 92 | 41 |
| 11/2 | very good | glossy | 77/88 | 93 | 52 |
| 12/3 | very good | glossy | 74/86 | 88 | 45 |
| 13/4 | very good | very bright | 82/91 | 82 | 35 |
| C2/C1 | good | glossy | 76/89 | 84 | 35 |

The results in Table 3 underlined the fact that the polyols (A) significantly enhanced not only the dry scratch resistance of the clearcoats but also their leveling and appearance.

What is claimed is:

1. A polyol (A) based on modified amino resins, for use in a thermally curable composition, prepared by reacting:
an amino resin (B) comprising three acetalized or etherified N-methylol groups of the general formula I:

   (I), wherein R is a hydrogen atom, an alkyl group of 1 to 6 carbon atoms or an aryl group of 6 to 10 carbon atoms and $R^1$ is an alkyl group of 1 to 6 carbon atoms; with
a polyol (C) of the general formula II:

   (II), wherein n is 2 and $R^2$ is a divalent organic radical and wherein polyol (C) is selected from the group consisting of positionally isomeric diethyloctanes containing a linear $C_8$ carbon chain and functionalized with two hydroxy groups;
  wherein an equivalent ratio of the acetalized or etherified N-methylol groups to the polyol (C) is 0.5:1 to 1.2:1;
  with elimination of at least 50 mol % of a monoalcohol (D) of the general formula Ia:

   (Ia), wherein $R^1$ is as defined above, from the amino resin (B),
  wherein the polyol (A) is capable of use in preparing a thermally curable coating material.

2. The polyol (A) of claim 1, wherein the amino resin (B) is selected from the group consisting of melamine resins, guanamine resins, urea resins, glycoluril resins, amides, compounds comprising at least two carbamate groups, and combinations thereof.

3. The polyol (A) of claim 2, wherein the amino resin (B) is a melamine resin.

4. The polyol (A) of claim 1, wherein R is a hydrogen atom.

5. The polyol (A) of claim 1, wherein the alkyl group $R^1$ is of 1 to 4 carbon atoms.

6. The polyol (A) of claim 5, wherein the alkyl group $R^1$ is selected from the group consisting of methyl, butyl, and isobutyl.

7. The polyol (A) of claim 6, wherein the monoalcohol (D) is selected from the group consisting of methanol, n-butanol, and isobutanol.

8. The polyol (A) of claim 1, wherein the equivalent ratio of the acetalized or etherified N-methylol groups to the polyol (C) is 0.6:1 to 1.1:1.

9. The polyol (A) of claim 8, wherein the equivalent ratio of the acetalized or etherified N-methylol groups to the polyol (C) is 1:1.

10. The polyol (A) of claim 1, wherein at least 60 mol % of the monoalcohol (D) is eliminated.

11. The polyol (A) of claim 1, wherein the monoalcohol (D) is removed from the polyol (A).

12. A process for preparing a polyol (A) based on modified amino resins, for use in a thermally curable composition, comprising reacting:
an amino resin (B) comprising three acetalized or etherified N-methylol groups of the general formula I:

   (I), wherein R is a hydrogen atom, an alkyl group of 1 to 6 carbon atoms or an aryl group of 6 to 10 carbon atoms and $R^1$ is an alkyl group of 1 to 6 carbon atoms; with
a polyol (C) of the general formula II:

   (II), wherein n is 2 and $R^2$ is a divalent organic radical wherein polyol (C) is selected from the group consisting of positionally isomeric diethyloctanes containing a linear $C_8$ carbon chain and functionalized with two hydroxy groups;
  wherein an equivalent ratio of the acetalized or etherified N-methylol groups to the polyol (C) is 0.5:1 to 1.2:1;
  with elimination of at least 50 mol % of a monoalcohol (D) of the general formula Ia:

   (Ia), wherein $R^1$ is as defined above, from the amino resin (B); and
  wherein the polyol (A) is capable of use in preparing a thermally curable coating material.

13. The process of claim 12, wherein the amino resin (B) is reacted with the polyol (C) at 80 to 150° C.

14. The process of claim 12, wherein the monoalcohol (D) is removed continuously during the reaction of the amino resin (B) with the polyol (C).

15. The process of claim 12, wherein the reacting the amino resin (B) with the polyol (C) is in the presence of a catalyst (E).

16. The process of claim 15, wherein the catalyst (E) is an acid catalyst.

17. A thermally curable material comprising the polyols (A) of claim 1.

18. The thermally curable material of claim 17, further curable physically, oxidatively, with actinic radiation, or a combination thereof.

19. The thermally curable material of claim 17, in the form of coating materials, adhesives, sealants or precursors for moldings or films.

20. The thermally curable material of claim 19, wherein the coating materials are electrocoat materials, prime-coating materials, surfacers, primers, basecoat materials, solid-color topcoat materials or clearcoat materials.

21. The thermally curable material of claim 20, wherein the coating materials are clearcoat materials.

22. The polyol (A) of claim 1, wherein the polyol (C) is 2,4-diethyloctane-1,5-diol.

23. The polyol (A) of claim 1, wherein R2 comprises a linear C8 carbon chain substituted by ethyl groups in the 2,3, 2,4, 2,5, 2,6, 2,7, 3,4, 3,5, 3,6, or 4,5 positions.

24. The polyol (A) of claim 23, wherein R2 comprises a linear C8 carbon chain substituted by hydroxyl groups in the 1,2, 1,3, 1,4, 1,5, 1,6, 1,7, 1,8, 2,3, 2,4, 2,5, 2,6, 2,7, 2,8, 3,4, 3,5, 3,6, 3,7, 3,8, 4,5, 4,6, 4,8, 5,6, 5,7, 5,8, 6,7, 6,8 or 7,8 positions.

25. A thermally curable material comprising a polyol (A) based on modified amino resins and a polyisocyanate, wherein the polyol (A) is prepared by reacting:

an amino resin (B) comprising three acetalized or etherified N-methylol groups of the general formula I:

$$>\!N\!\!-\!\!CHR\!\!-\!\!OR^1 \quad (I),$$

wherein R is a hydrogen atom, an alkyl group of 1 to 6 carbon atoms or an aryl group of 6 to 10 carbon atoms and $R^1$ is an alkyl group of 1 to 6 carbon atoms;

with a polyol (C), wherein polyol (C) is 2,4-diethyloctane-1,5-diol;

wherein an equivalent ratio of the acetalized or etherified N-methylol groups to the polyol (C) is 0.5:1 to 1.2:1;

with elimination of at least 50 mol % of a monoalcohol (D) of the general formula Ia:

$$R^1\!\!-\!\!OH \quad (Ia),$$

wherein $R^1$ is as defined above, from the amino resin (B).

26. The polyol (A) of claim 1, wherein the polyol (A) capable of use in preparing a thermally curable coating material that is a clearcoat for an automobile.

* * * * *